United States Patent
Boss et al.

(10) Patent No.: US 8,126,607 B2
(45) Date of Patent: Feb. 28, 2012

(54) VEHICLE FLUID REPLACEMENT TRACKING

(75) Inventors: Gregory J. Boss, American Fork, UT (US); Peter G. Finn, Brampton, CA (US); Rick A. Hamilton, II, Charlottesville, VA (US); Brian M. O'Connell, Cary, NC (US); James W. Seaman, Falls Church, VA (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 12/261,278

(22) Filed: Oct. 30, 2008

(65) Prior Publication Data

US 2010/0114417 A1    May 6, 2010

(51) Int. Cl.
*G06F 19/00* (2011.01)
*G01M 17/00* (2006.01)

(52) U.S. Cl. .............. 701/29; 701/35; 701/33

(58) Field of Classification Search .......... 701/29, 701/33, 35
See application file for complete search history.

(56) References Cited

U.S. PATENT DOCUMENTS

| | | | | |
|---|---|---|---|---|
| 4,862,393 | A | * | 8/1989 | Reid et al. .............. 701/30 |
| 5,301,643 | A | * | 4/1994 | Garcyalny .............. 123/198 D |
| 5,402,110 | A | * | 3/1995 | Oliver et al. .............. 340/605 |
| 6,112,152 | A | | 8/2000 | Tuttle |
| 6,577,959 | B1 | * | 6/2003 | Chajec et al. .............. 702/50 |
| 6,611,740 | B2 | | 8/2003 | Lowrey et al. |
| 6,993,421 | B2 | | 1/2006 | Pillar et al. |
| 7,042,346 | B2 | | 5/2006 | Paulsen |
| 7,082,359 | B2 | | 7/2006 | Breed |

(Continued)

*Primary Examiner* — Sarah B McPartlin
(74) *Attorney, Agent, or Firm* — Patrick J. Daugherty; Driggs, Hogg, Daugherty & Del Zoppo Co., LPA

(57) ABSTRACT

The present invention provides a system, method, and program product for sensing and tracking vehicle fluid replacement in a vehicle by sensing information indicative of a first fluid draining from a fluid reservoir and/or a second fluid entering the fluid reservoir, recording fluid drain and fill events based on the information, and generating a fluid replacement history based on the recorded events.

22 Claims, 2 Drawing Sheets

U.S. PATENT DOCUMENTS

| | | |
|---|---|---|
| 7,138,917 B2 | 11/2006 | Nishiwaki |
| 7,162,370 B2 | 1/2007 | Obradovich |
| 7,486,179 B2 * | 2/2009 | McCormick et al. ...... 340/450.3 |
| 7,793,981 B2 * | 9/2010 | Xie et al. ...................... 280/785 |
| 2003/0102050 A1 * | 6/2003 | Matthews et al. ............... 141/65 |
| 2006/0132351 A1 | 6/2006 | Le Sesne |
| 2010/0264132 A1 * | 10/2010 | Koelmel et al. ............... 219/647 |

\* cited by examiner

VEHICLE FLUID REPLACEMENT TRACKING

FIELD OF THE INVENTION

The present invention generally relates to vehicle fluid replacement tracking and, more particularly, to a method, system, and program product for sensing and tracking vehicle fluid replacement. It is also amenable to other applications in which it is desirable to sense and track the replacement of a fluid.

BACKGROUND OF THE INVENTION

Vehicles, for example an automobile, use various fluids such as oil, brake fluid, transmission fluid, coolant, etc. during operation. These fluids break down over time and/or with use and, thus, should be periodically replaced. If not, the performance and/or lifetime of various components may be compromised.

The manufacturer of the vehicle typically provides a maintenance schedule that includes a recommended timetable for replacing such fluids, and the schedule often takes into account driving habits, environmental conditions, etc. By way of example, the preventative maintenance schedule may recommend that the oil be replaced every 3,000 miles or 3 months, whichever is sooner. Alternative oil replacement schedules that vary based on the relative percentage of non-highway to highway driving and/or the climate may be provided. By not following the schedule, the warranty as well as the performance and/or lifetime of various components may be compromised.

SUMMARY OF THE INVENTION

In general, the present invention provides a method, system, and program product for sensing and tracking fluid replacement. This is accomplished by using a sensor that senses when a fluid is being drained and a sensor that senses when a fluid is being added to a fluid reservoir. The sensed information is stored in a storage medium and can be easily retrieved. In one aspect, the stored sensed information provides a record for fluid replacement.

In one aspect, a system for sensing and tracking fluid replacement in a vehicle includes a drain sensor that senses a first parameter indicative of a first fluid draining from a reservoir in the vehicle and a fill sensor that senses a second parameter indicative of a second fluid entering the reservoir. A controller obtains the first and second parameters, and a storage component stores the first and second parameters.

In another aspect, a method for sensing and tracking vehicle fluid replacement includes sensing a first parameter indicative of a first fluid draining from a fluid reservoir in the vehicle, sensing a second parameter indicative of a second fluid entering the fluid reservoir, storing a drain event and a fill event based on the first and second parameters, and generating a fluid replacement history based on stored drain and fill events.

In another aspect, a method includes producing computer executable program code, storing the code on a computer readable medium, and providing the program code to be deployed and executed on a computer system. The program code comprising instructions which, when executed on the computer system, cause the computer system to sense a first parameter indicative of a first fluid draining from a fluid reservoir in a vehicle, sense a second parameter indicative of a second fluid entering the fluid reservoir, store a drain event and a fill event based on the sensed first and second parameters, and provide a fluid replacement history based on stored events.

In another aspect, a method for deploying an application for sensing and tracking vehicle fluid replacement includes providing a computer infrastructure being operable to sense a first parameter indicative of a first fluid draining from a fluid reservoir in a vehicle, sense a second parameter indicative of a second fluid entering the fluid reservoir, store a fluid drain event and a fluid fill event based on the sensed first and second parameters, and generate a fluid replacement history based on stored events.

BRIEF DESCRIPTION OF THE DRAWINGS

These and other features of this invention will be more readily understood from the following detailed description of the various aspects of the invention taken in conjunction with the accompanying drawings in which.

Figure 1:
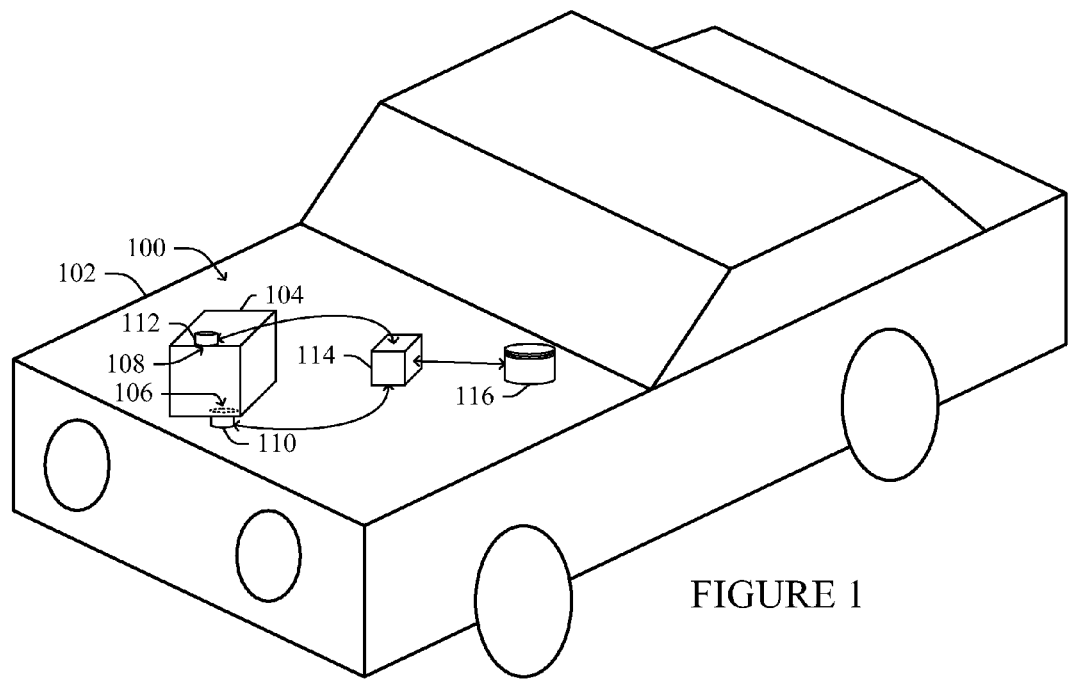
FIG. 1 illustrates a system for sensing and tracking vehicle fluid replacement.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections I. General Description II. Computerized Implementation I. General Description Conventionally, one cannot readily ascertain whether a fluid of a vehicle has been replaced. The present invention provides a system, method, and program product for sensing and tracking when a fluid has been replaced. The tracked data is easily retrievable and can be used to validate that a fluid has been replaced.

As noted above, vehicles use various fluids during operation. For explanatory purposes, FIG. 1 illustrates a vehicle fluid replacement sensing and tracking system 100 within a vehicle such as a car 102. However, the vehicle could be a truck, a motorcycle, a boat, another vehicle, or a non-vehicle that includes a fluid reservoir. The car 102 includes at least one reservoir 104 that holds a fluid such as oil, gasoline, brake fluid, transmission fluid, coolant, window washer fluid, or the like. For explanatory purposes, the reservoir 104 is shown near the front of the car 102. However, the reservoir 104 may be located elsewhere in the car 102, such as nearer the rear of the car 102, depending on the particular fluid held in the reservoir. In addition, the shape of the illustrated reservoir 104 is shown for explanatory purposes. The reservoir 104 may be various other shapes.

The reservoir 104 includes an exit or a drain port 106 and an entry or a fill port 108. The drain port 106 can be used to drain or otherwise remove a (first or second) fluid from the reservoir 104. A reservoir or port-sealing component (not shown) such as a drain plug may be used to close and seal the drain port 106 when fluid is not being drained from the reservoir 104. The fill port 108 provides access into the reservoir 104. The fill port 108 can be used to fill the reservoir 104 with a suitable fluid. A port-sealing component (not shown) such as a cap may be used to close and seal the fill port 108 when fluid is not being inserted into the reservoir 104. It is to be understood that the illustrated location and geometry of the drain and fill ports 106 and 108 are for explanatory purposes. Other locations and geometries are contemplated herein.

A fluid draining detection apparatus such as a drain (first or second) sensor 110 operates in connection with the drain port 106. The drain sensor 110 may be located external to the reservoir 104 (as shown), inside of the reservoir 104, or partially within and partially outside of the reservoir 104. As described in greater detail below, the drain sensor 110 senses a (first or second) parameter indicative of a first or second flow state, or the removal of the drain port plug and/or the flow of fluid through the drain port 106 and out of the reservoir 104. Where more than one reservoir 104 is present, each reservoir 104 may include its own drain sensor 110.

A fluid filling detection apparatus such as a fill (first or second) sensor 112 operates in connection with the fill port 108. Likewise, the fill sensor 112 may be located external to the reservoir 104 (as shown), inside of the reservoir 104, or partially within and partially outside of the reservoir 104. As described in greater detail below, the fill sensor 112 senses a (first or second) parameter indicative of a first or second flow state, or the removal of the fill port cap and/or the flow of fluid entering the reservoir 104 via the fill port 108. Likewise, where more than one reservoir 104 is present, each reservoir 104 may include its own fill sensor 112.

A control component 114 communicates with the drain and fill sensors 110 and 112. In one instance, this includes reading information or parameters from the drain and fill sensors 110 and 112. Additionally or alternatively, this includes receiving information or parameters emitted by the drain and fill sensors 110 and 112. Such information may include information about the state of the fluid in the reservoir 104 such as, for example, whether fluid is draining from or entering the reservoir 104. The control component 114 may also send information to the drain and fill sensors 110 and 112.

The communication paths between the control component 114 and the drain and fill sensors 110 and 112 may be wireless and/or wired. As illustrated, the control component 114 is located near the front of the car 102 by the sensors 110 and 112. However, the control component 114 may be located elsewhere in the car 102 or external to the car 102 such as at an individual's residence, a dealership, a repair shop, and the like. When installed in the vehicle 102, the control component 114 may be powered by the car battery, a battery local to the control component 114, and/or other source of power, for example, a solar cell, etc. When installed outside of the vehicle 102, the control component 114 may be powered by power mains, a battery, and/or other source of power.

A storage component 116 stores the information such as the sensed parameters and/or other information. The storage component 116 may include memory or other storage medium for storing information. Examples of information stored in the storage component 116 include fluid draining and/or filling events, including the date, the time of day, and/or the (first or second) time duration of the event, a (first, second or third) unique identifier of the reservoir 104 and/or sensors 110 and 112 in order to associate the event with a particular fluid, and/or other information related to the draining or filling of a fluid.

The storage component 116 may be affixed to the car 102, such as near the front of the car 102 as depicted or elsewhere in the car 102. Alternatively, the storage component 116 may be part of a portable device that can be variously placed in the car 102. Alternatively, the storage component 116 may be located external to the car 102 such as at an individual's residence, a dealership, a repair shop, and the like. The communication path between the control component 114 and the storage component 116 may be wireless and/or wired. In addition, the storage component 116 can communicate with various other devices such as a computer, a personal data assistant, a cell phone, a cell tower, a network, a printer, another storage component, and the like.

As noted above, various drain sensors are contemplated herein. Examples of suitable, non-limiting drain sensors 110 are now further described. In one instance, the drain sensor 110 includes a closed circuit magnetic latch sensor or the like. With such a sensor, when a drain port sealing component such as a plug is closed, a magnet in the plug pulls a metal switch or the like in the housing into a closed (or open) state, thereby completing (or opening) a circuit. This state would indicate that a fluid draining event is not in progress. When the plug is removed, the circuit opens (or closes), and this state indicates that a fluid draining event is in progress.

In another example, a timer is used in connection with the closed circuit magnetic sensor described above. With this example, the timer is turned on when the circuit is opened (or closed) and turned off when the circuit is closed (or open). The timer times the duration in which the circuit is in the open (or closed) state. The time duration can be used to determine whether the plug was removed long enough for the volume of fluid in the reservoir 104 to drain. For example, the time duration can be compared with a drain time threshold, wherein exceeding the threshold may indicate that the fluid drained from the reservoir. Factors considered in determining a suitable time duration include the viscosity of the fluid, the temperature of the fluid, the size of the drain port, and/or other factors.

In another example, a fluid-level sensor may be employed to detect draining fluid. For example, a float-level sensor may be employed. Such a sensor may include a float, made of foam and/or another buoyant material, operatively coupled or connected to a lever-rod. The end of the rod may be attached to a slide assembly, which in turn is attached to a variable resistor, or variable resistive component. The resistor may include a strip of resistive material connected on one side to electrical ground. With such a configuration, the slide assembly may be attached to the float rod such that when the float moves up and down the slide moves along the resistive strip.

If the slide is close to the grounded side of the strip, there is less resistive material in the path of the current so the resistance is small, and if the slide is at the other end of the strip there is more resistive material in the electrical path, and thus the resistance is relatively larger. When the float is near the top of the reservoir 104, and the fluid level is high and the slide is close to the ground, there is little resistance, which may indicate no draining has occurred. When the float is near the bottom of the reservoir 104, there is high resistance, which indicates that the fluid has been drained. The resistance value can be mapped to the volume of the reservoir 104 such that for any resistance value, the amount of fluid in the reservoir can be approximated.

In another example, a scale sensor capable of measuring the mass of the fluid present in a fluid container is used to detect a fluid draining event. In one instance, a sensor is mechanically coupled to the reservoir 104. The sensor may include a spring or the like that is capable of lifting as a function of the amount of fluid in the reservoir 104. For instance, when the reservoir 104 is empty, the spring may lift the reservoir to a first height. As the reservoir 104 fills with a fluid, the height of the reservoir 104 changes. The current height of the reservoir 104 is indicative of the volume of the fluid in the reservoir 104 at any given time. The height can be measured using a variable resistor or the like. In this instance, when the reservoir 104 is full, the variable resistor indicates low resistance, which indicates that no draining has taken place. When the fluid container is empty, the resistance of the variable resistor increases, which indicates a drain event has occurred. The resistance value can be mapped to the volume of the reservoir 104 such that for any resistance value, the amount of fluid in the reservoir can be approximated.

In another example, a paddle wheel sensor is installed in the reservoir 104. The paddle wheel may include a funnel, a paddle wheel, and a rotation measurement device attached via a spoke to the paddle wheel. The sensor apparatus is located between the drain port 106 and the cavity inside the reservoir 104. When the fluid is removed from the reservoir 104, the fluid passes through the paddle wheel. The funnel in the apparatus channels the fluid onto the paddle wheel, which in turn rotates the paddle wheel, where the rotation is measured by the rotation measurement device. If the rotation measurement device rotates, a predetermined number of times after a drain event the container is determined to have been filled and a replacement event has thus occurred. The number of rotations of the wheel can be mapped to the volume of the reservoir 104 such that for any number of turns, the amount of fluid in the reservoir can be approximated.

In order to make the apparatus tamper resistant, embodiments would make the paddle wheel inaccessible from outside of the container. Additionally, the paddle wheel would be disabled while the filling cap is attached to the container. Disabling of the paddle wheel could either be occur via a mechanical stop or an electrical stop using the technology described in the closed circuit magnetic sensor apparatus. This would prevent possible wheel rotation from occurring or registering as fluid fill detection during regular vehicle movement and normal flow of such vehicle fluids.

Other applicable systems for measuring fluid flow and/or levels are also contemplated herein.

Also noted above, various fill sensors are contemplated herein. Suitable, non-limiting fill sensors 112 include sensors such as those described above in connection with the drain sensor 110. For instance, a suitable fill sensor 112 includes a magnetic sensor with or without a timer, a fluid level sensor, a scale sensor, a paddle wheel sensor, and/or other sensor.

With a closed circuit magnetic latch sensor, when a fill port sealing component such as a fill cap is tightened, a magnet in the cap pulls a metal switch or the like in the housing into a closed (or open) state, thereby completing (or opening) a circuit. This state would indicate that a fluid filling event is not in progress. When the cap is removed, the circuit opens (or closes), and this state indicates that a fluid filling event is in progress. A timer may be used to time the duration in which the circuit is in the open (or closed) state. The time duration can be compared with a fill time threshold, wherein exceeding the threshold may indicate that the reservoir is filled with the fluid.

For the float-level and scale sensors, the same sensors may be used to sense a drain event and a fill event. Alternatively, separate sensors may be used to sense a drain event and a fill event. In either instance, the resistance of the variable resistor is based on the level or height of the sensor and is indicative of the level of the fluid in the reservoir 104, as described above.

With a paddle wheel sensor, the sensor apparatus is located between the fill port 108 and the cavity inside the reservoir 104. When the fluid enters the reservoir 104, the fluid passes through the paddle wheel, and the paddle rotates. As described above, the number of rotations of the paddle wheel is indicative of the amount of fluid in the reservoir 104.

Likewise, other applicable systems for measuring fluid flow and/or levels are also contemplated herein.

Figure 2:
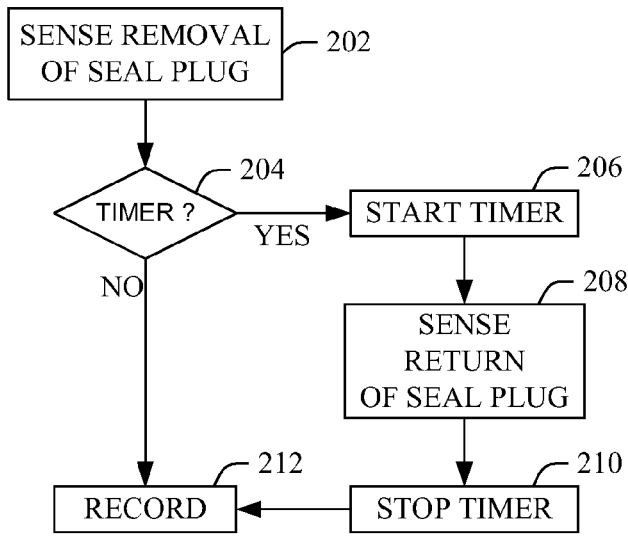
FIG. 2 illustrates a method for sensing fluid draining from a reservoir.
Figure 3:
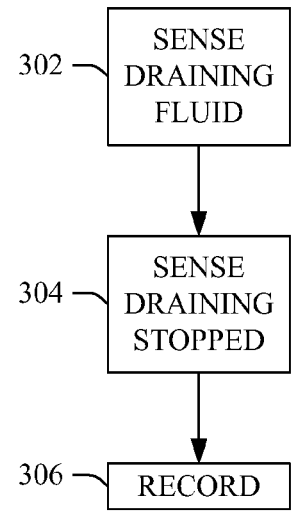
FIG. 3 illustrates a method for sensing fluid draining from a reservoir.

FIGS. 2 and 3 illustrate methods for sensing and tracking a fluid draining event. Initially referring to FIG. 2, at 202 the removal of a sealing component such as a drain plug or the like is sensed. As described above, the drain plug may include a magnetic sensor that opens and closes a circuit depending on whether the drain plug is removed from or used to seal the drain port 106. When the drain plug is removed, the circuit opens, which indicates a drain event, or that fluid is draining from the drain port 106.

At 204, if a timer is being employed to time the duration of the drain event, then at 206 the timer is started. At 208, the return of the drain plug is sensed, for example, as indicated by the closing of the circuit by the magnet. At 210 the timer is stopped. At 212, the drain event along with the time duration is recorded in the storage component 116, for example, in a fluid replacement record or history. If at 204 the timer is not being employed, then the drain event is recorded in the storage component 116 without using the timer.

The recorded information can be retrieved to validate that the fluid was drained from the reservoir 104. Depending on the recorded information, this may include determining whether the fluid drained long enough to have emptied out of the reservoir 104 based on the time duration.

Turning to FIG. 3, at 302 the flow of fluid from the drain port 106 is sensed. As described above, a float, scale, paddle wheel or other sensor may be used to determine when fluid is draining from the reservoir 104 via the drain port 106. With the float and scale sensors, a variable resistor varies in resistance based on the volume of the fluid in the reservoir 104, and the resistance level is used to indicate a drain event. With the paddle wheel, the wheel turns as fluid passes the wheel, and a turning wheel or a preset number of turns indicates a drain event.

At 304, the stopping of the flow of fluid from the drain port 106 is sensed. With the float and scale sensors, a resistance level corresponding to a substantially empty reservoir or a resistance level that has not changed for a preset period of time indicates the drain event has terminated. Similarly, with the paddle wheel, the stopping of the paddle wheel from rotating for a preset period of time or a preset number of turns indicates the drain event has terminated.

At 306, the drain event is recorded in the storage component 116. In addition, information reflective of the volume of fluid, if any, remaining in the reservoir 104 is recorded in the storage component 116. As noted above, the recorded information can be retrieved to validate that the fluid was drained from the reservoir 104. In this case, the information may be used to determine the approximate volume, if any, of the fluid remaining in the reservoir 104. If more than a threshold volume of fluid remains, the drain event may be flagged as such.

Figure 4:
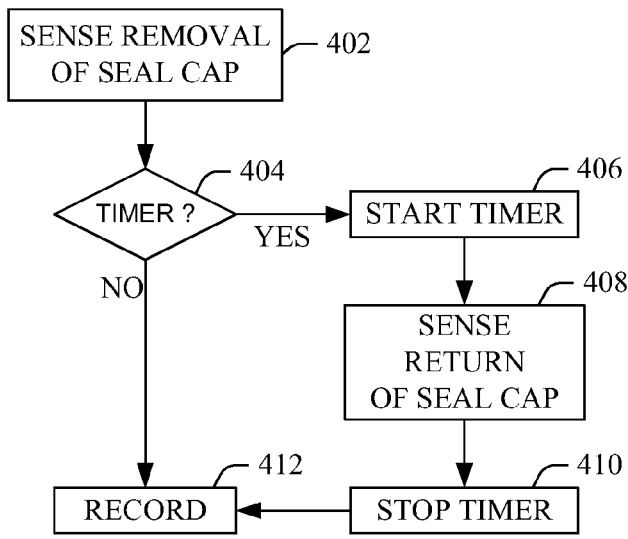
FIG. 4 illustrates a method for sensing fluid entering a reservoir.
Figure 5:
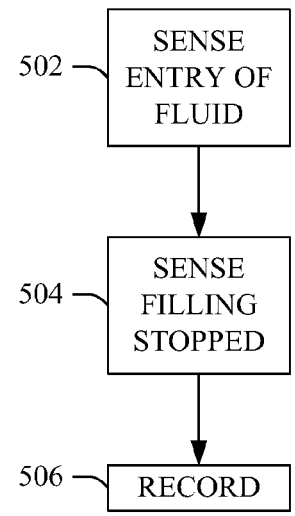
FIG. 5 illustrates a method for sensing fluid entering a reservoir.

FIGS. 4 and 5 illustrate a method for sensing and tracking a fluid filling event. Initially referring to FIG. 4, at 402 the removal of a sealing component such as a fill cap or the like is sensed. As described above, the fill cap may include a magnetic sensor that opens and closes a (first, or first magnetic) circuit depending on whether the fill cap is removed from or used to seal the fill port 108. When the fill cap is removed, the circuit opens, which indicates a fluid is entering the fill port 108.

At 404, if a timer is being employed to time the duration of the fill event, then at 406 the timer is started. At 408, the return of the fill cap is sensed, for example, as indicated by the closing of the circuit by the magnet. At 410 the timer is stopped. At 412, the fill event along with the time duration is recorded in the storage component 116. If at 404 the timer is not being employed, then the fill event is recorded in the storage component 116 without using the timer.

The recorded information can be retrieved to validate that the reservoir 104 is filled. Depending on the recorded information, this may include determining whether a long enough period of time passed to have filled the reservoir 104 based on the time duration. The recorded information can also be retrieved to determine if a fill cap has been removed longer than necessary, which may result in contaminants such as dust or other airborne particles entering the reservoir. In one instance, this can be achieved by comparing the time duration with a preset time threshold, for example, a threshold set in accordance with an estimated maximum fill time. Such a threshold may be used to determine if the fill cap was returned or re-installed within a suitable time after filling the reservoir so as to mitigate contamination of the fluid by matter (e.g., dust, dirt, etc.) external to the reservoir after filling the reservoir.

Turning to FIG. 5, at 502 the flow of fluid into the reservoir 104 through the fill port 108 is sensed. As described above, a float, scale, paddle wheel or other sensor may be used to determine when fluid is entering the reservoir 104. With the float and scale sensors, a variable resistor varies in resistance based on the volume of the fluid in the reservoir 104, and the resistance level is used to indicate a fill event. With the paddle wheel, the wheel turns as fluid passes the wheel, and a turning wheel or a preset number of turns indicates a fill event.

At 504, the stopping of the flow of fluid into the reservoir 104 is sensed. With the float and scale sensors, a resistance level corresponding to a substantially full reservoir 104 or a resistance level that has not changed for a preset period of time indicates the fill event has terminated. Similarly, with the paddle wheel, the stopping of the paddle wheel from rotating for a preset period of time or a preset number of turns indicates the fill event has terminated.

At 506, the fill event is recorded in the storage component 116. In addition, information reflective of the volume of fluid in the reservoir 104 is recorded in the storage component 116. As noted above, the recorded information can be retrieved to validate that the reservoir 104 is filled. In this case, the information may be used to determine the approximate volume of the fluid. If less than a threshold volume of fluid is in the reservoir, the fill event may be flagged as such.

It is to be appreciated that one or more of the fluids may be the same type of fluid, e.g. gasoline, motor oil, gear lubricant, transmission fluid, anti-freeze radiator fluid, window washer fluid, brake fluid, etc. It is also to be appreciated that that one or more reservoirs may include: gear cases, differential cases, transfer cases, transmission cases, crank cases, gasoline tanks, window washer fluid tanks, brake master cylinders, radiators, and radiator fluid recovery bottles.

II. Computerized Implementation

Figure 6:
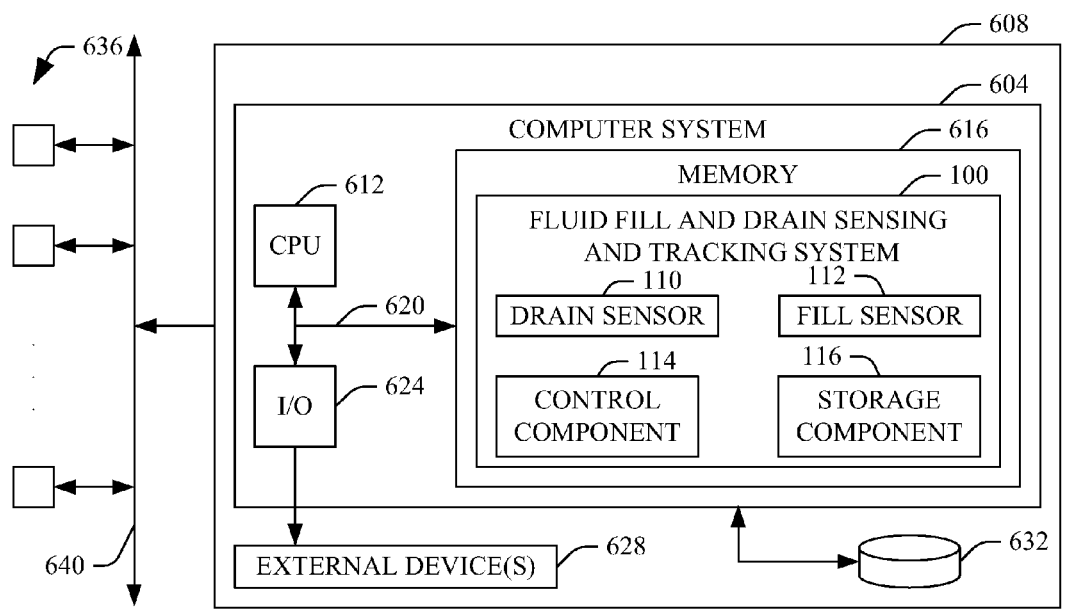
FIG. 6 illustrates an exemplary computerized implementation of the fluid replacement sensing and tracking system and method.

Referring now to FIG. 6, an exemplary computerized implementation includes a computer system 604 deployed within a computer infrastructure 608 such as one existing with the car 102 described above. This is intended to demonstrate, among other things, that the present invention could be implemented within a network environment (e.g., the Internet, a wide area network (WAN), a local area network (LAN), a virtual private network (VPN), etc.), or on a stand-alone computer system.

In the case of the former, communication throughout the network can occur via any combination of various types of communication links. For example, the communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, computer infrastructure 608 is intended to demonstrate that some or all of the components of implementation could be deployed, managed, serviced, etc. by a service provider who offers to implement, deploy, and/or perform the functions of the present invention for others.

As shown, the computer system 604 includes a processing unit 612, a memory 616, a bus 620, and input/output (I/O) interfaces 624. Further, the computer system 604 is shown in communication with external I/O devices/resources 628 and storage system 632. In general, the processing unit 612 executes computer program code, such as the code to implement various components of the fluid draining and filling sensing and tracking system 100, which is stored in memory 616 and/or storage system 632. It is to be appreciated that two or more, including all, of these components may be implemented as a single component.

While executing computer program code, the processing unit 612 can read and/or write data to/from the memory 616, the storage system 632, and/or the I/O interfaces 624. The bus 620 provides a communication link between each of the components in computer system 604. The external devices 628 can comprise any devices (e.g., keyboard, pointing device, display, etc.) that enable a user to interact with computer system 604 and/or any devices (e.g., network card, modem, etc.) that enable computer system 604 to communicate with one or more other computing devices.

The computer infrastructure 608 is only illustrative of various types of computer infrastructures for implementing the invention. For example, in one embodiment, computer infrastructure 608 comprises two or more computing devices (e.g., a server cluster) that communicate over a network to perform the various process steps of the invention. Moreover, computer system 604 is only representative of various possible computer systems that can include numerous combinations of hardware.

To this extent, in other embodiments, computer system 604 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively.

Moreover, the processing unit 612 may comprise a single processing unit, or be distributed across one or more processing units in one or more locations, e.g., on a client and server. Similarly, the memory 616 and/or the storage system 632 can comprise any combination of various types of data storage and/or transmission media that reside at one or more physical locations.

Further, I/O interfaces 624 can comprise any system for exchanging information with one or more of the external device 628. Still further, it is understood that one or more additional components (e.g., system software, math co-processing unit, etc.) not shown in FIG. 6 can be included in computer system 604. However, if computer system 604 comprises a handheld device or the like, it is understood that one or more of the external devices 628 (e.g., a display) and/or the storage system 632 could be contained within computer system 604, not externally as shown.

The storage system 632 can be any type of system (e.g., a database) capable of providing storage for information under the present invention. To this extent, the storage system 632 could include one or more storage devices, such as a magnetic disk drive or an optical disk drive. In another embodiment, the storage system 632 includes data distributed across, for example, a local area network (LAN), wide area network (WAN) or a storage area network (SAN) (not shown). In addition, although not shown, additional components, such as cache memory, communication systems, system software, etc., may be incorporated into computer system 604.

Shown in the memory 616 of computer system 604 is the fluid draining and filling detection and tracking system, which includes the drain sensor 110, the fill sensor 112, the control component 114, and/or the storage component 116. In another implementation, these components, including all of the components, can be a single component. These components perform the functions discussed above. More particularly, the drain sensor 110 senses when and/or how mush fluid drains form the reservoir 4, the fill sensor 112 senses when and/or how mush fluid enters the reservoir 104, and the control component 114 obtains this information and stores it, along with other information related to draining and filling the fluid, in the storage component 116. In the illustrated embodiment, the system 100 communicates with external entities 636 such as another computing system, a tracking database, another vehicle, other apparatuses external to the vehicle, etc. over a path 640, which may be wired (as shown) or wireless.

While shown and described herein as a method and a system, it is understood that the invention further provides various alternative embodiments. For example, in one embodiment, the invention provides a computer-readable/useable medium that includes computer program code to enable a computer infrastructure to sense and track fluid replacement. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 616 (FIG. 6) and/or the storage system 632 (FIG. 6) (e.g., a fixed disk, a read-only memory, a random access memory, a cache memory, etc.).

In another embodiment, the invention provides a business method that performs the process steps of the invention on a subscription, advertising, and/or fee basis. That is, a service provider could offer to manage the fluid replacement tracking apparatus. In this case, the service provider can create, maintain, support, etc., a computer infrastructure, such as the computer infrastructure 608 (FIG. 6) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing the fluid replacement tracking system. In this case, a computer infrastructure, such as computer infrastructure 608 (FIG. 6), can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 404 (FIG. 4), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A system for sensing and tracking fluid replacement in a vehicle, comprising:
a first sensor that senses a first parameter indicative of a first flow state of a first fluid in a fluid reservoir in the vehicle;
a controller that obtains the first parameter; and
a storage component that stores the first parameter; and
wherein the first sensor includes a first magnetic circuit, wherein the first circuit transitions to one of an open or a closed state when a reservoir sealing component is removed, and wherein opening or closing the circuit indicates that the first fluid is one of draining or entering the reservoir.

2. The system of claim 1, wherein the first sensor is a drain sensor and the first parameter is indicative of the first fluid draining from the reservoir.

3. The system of claim 1, wherein the first sensor is a fill sensor and the first parameter is indicative of the first fluid entering the reservoir.

4. The system of claim 1, further including a second sensor that senses a second parameter indicative of a second flow state of a second fluid in the fluid reservoir, wherein the controller obtains the second parameter and the storage component stores the second parameter.

5. The system of claim 4, wherein the first sensor is a drain sensor and the first parameter is indicative of the first fluid draining from the reservoir and the second sensor is a fill sensor and the second parameter is indicative of a second fluid entering the reservoir.

6. The system of claim 1, wherein the first parameter indicates that the first fluid drained from the reservoir.

7. The system of claim 1, wherein the first parameter indicates that the reservoir is filled with the first fluid.

8. The system of claim 1, wherein the first parameter is indicative of a volume of fluid in the reservoir.

9. The system of claim 1, wherein the first parameter forms part of a fluid replacement record for the vehicle.

10. The system of claim 1, further including a timer that times a duration in which the circuit is open or closed, wherein the time duration is stored in the storage component and used to determine if the first fluid drained or filled the reservoir.

11. The system of claim 10, wherein the time duration is compared with a threshold set in accordance with an estimated maximum fill time to determine if the reservoir sealing component was re-installed within a suitable time after filling the reservoir so as to mitigate contamination of the first fluid by matter external to the reservoir after filling the reservoir.

12. The system of claim 1, wherein the first sensor includes a variable resistive component with a resistance level that is a function of a volume of the first fluid in the reservoir.

13. The system of claim 12, wherein the first sensor is one of a float sensor or a scale sensor.

14. The system of claim 1, wherein the sensor includes a paddle wheel sensor in which the number of turns of the paddle wheel respectively corresponds to an amount of the first fluid draining from or entering the reservoir.

15. A method for sensing and tracking vehicle fluid replacement, comprising:
   sensing a first parameter indicative of a first fluid draining from a fluid reservoir in a vehicle;
   sensing a second parameter indicative of a second fluid entering the fluid reservoir;
   storing a drain event and a fill event based on the first and second parameters;
   storing information identifying a type of fluid along with the drain and fill events, wherein the information includes at least one of a first unique identifier that identifies the reservoir, a second unique identifier that identifies the drain sensor, and a third unique identifier that identifies the fill sensor; and
   generating a fluid replacement history based on the stored drain and fill events.

16. The method of claim 15, wherein the history is stored local to the vehicle.

17. The method of claim 15, further including conveying the sensed parameters over one of a wireless or wired communication channel.

18. The method of claim 15, further including using one of a magnetic circuit sensor, a fluid float sensor, a scale sensor, or a paddle wheel sensor to sense the first and second parameters.

19. The method of claim 15, wherein the drain and fill events validate replacement of at least one of the first fluid and the second fluid.

20. A method for sensing and tracking vehicle fluid replacement, comprising:
   sensing a first parameter indicative of a first fluid draining from a fluid reservoir in a vehicle and timing a first time duration in which the first fluid is draining from the reservoir;
   sensing a second parameter indicative of a second fluid entering the fluid reservoir and timing a second time duration in which the second fluid is entering the reservoir;
   storing a drain event and a fill event based on the first and second parameters; and
   generating a fluid replacement history based on stored drain and fill events that includes the first and second time durations with corresponding drain and fill events.

21. An article of manufacture, comprising:
   a computer-readable tangible storage device having computer readable program code embodied therewith to be deployed and executed on a computer system;
   the program code comprising instructions which, when executed on the computer system, cause the computer system to:
   sense a first parameter indicative of a first fluid draining from a fluid reservoir in a vehicle;
   sense a second parameter indicative of a second fluid entering the fluid reservoir;
   store a drain event and a fill event based on the sensed first and second parameters;
   store information identifying a type of fluid along with the drain and fill events, wherein the information includes at least one of a first unique identifier that identifies the reservoir, a second unique identifier that identifies the drain sensor, and a third unique identifier that identifies the fill sensor; and
   provide a fluid replacement history based on the stored drain and fill events.

22. A method for deploying an application for sensing and tracking vehicle fluid replacement, comprising:
   providing a computer infrastructure that:
   senses a first parameter indicative of a first fluid draining from a fluid reservoir in a vehicle;
   senses a second parameter indicative of a second fluid entering the fluid reservoir;
   stores a fluid drain event and a fluid fill event based on the sensed first and second parameters;
   stores information identifying a type of fluid along with the drain and fill events, wherein the information includes at least one of a first unique identifier that identifies the reservoir, a second unique identifier that identifies the drain sensor, and a third unique identifier that identifies the fill sensor; and
   generates a fluid replacement history based on the stored drain and fill events.

* * * * *